R. C. SEYMOUR.
METHOD OF MAKING PAMPHLETS OR MAGAZINES.
APPLICATION FILED MAY 23, 1911.

1,015,745.

Patented Jan. 23, 1912.

4 SHEETS—SHEET 1.

Witnesses:
R. C. Seymour Inventor
By his Attorney John D. Morgan

R. C. SEYMOUR.
METHOD OF MAKING PAMPHLETS OR MAGAZINES.
APPLICATION FILED MAY 23, 1911.
1,015,745.
Patented Jan. 23, 1912.
4 SHEETS—SHEET 2.
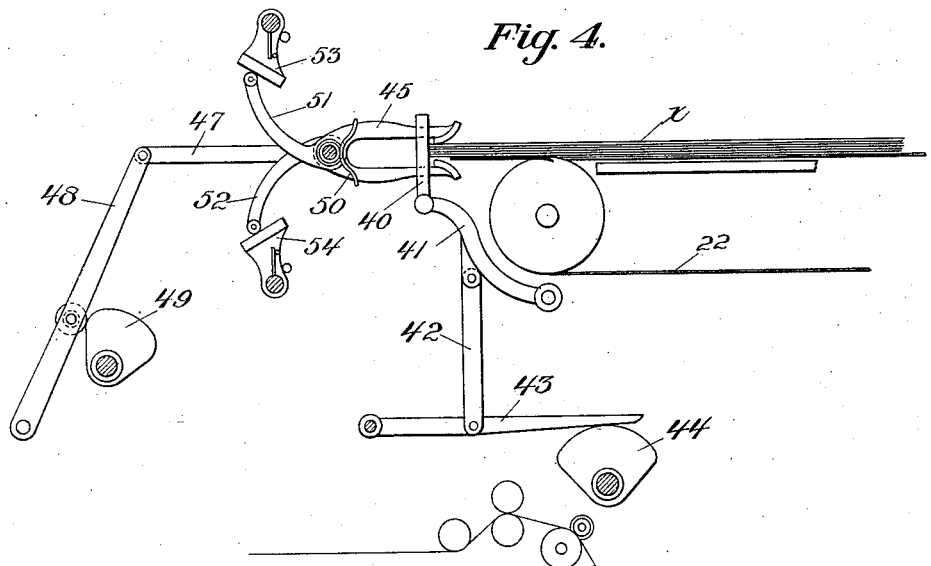
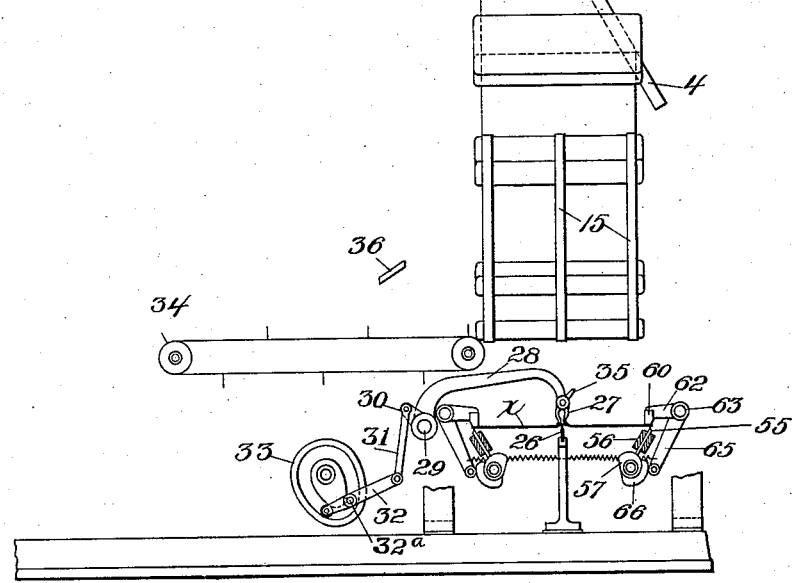

R. C. SEYMOUR.
METHOD OF MAKING PAMPHLETS OR MAGAZINES.
APPLICATION FILED MAY 23, 1911.
1,015,745.
Patented Jan. 23, 1912.
4 SHEETS—SHEET 3.
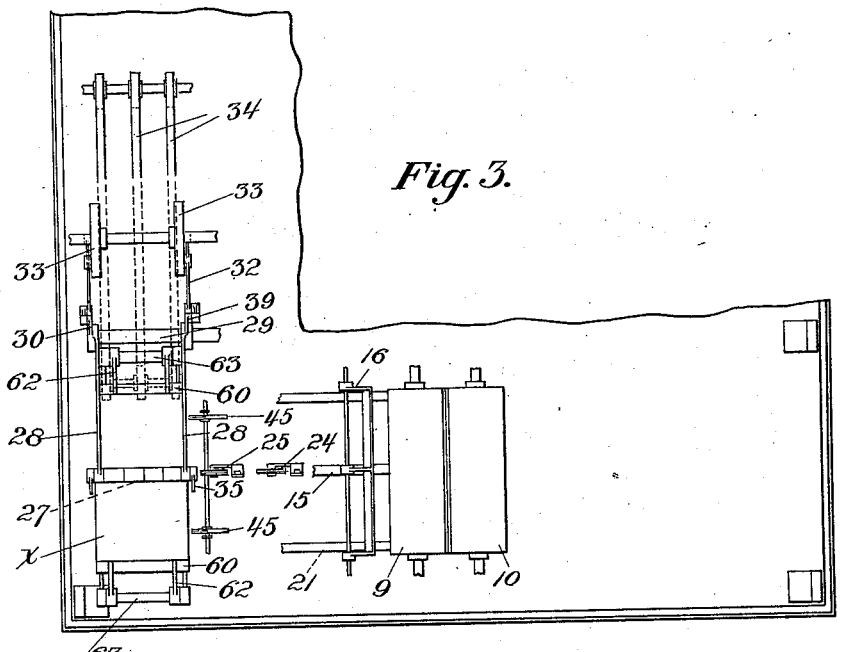
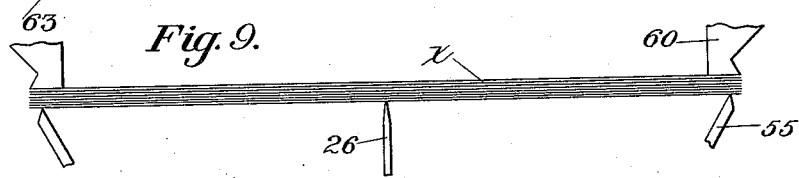
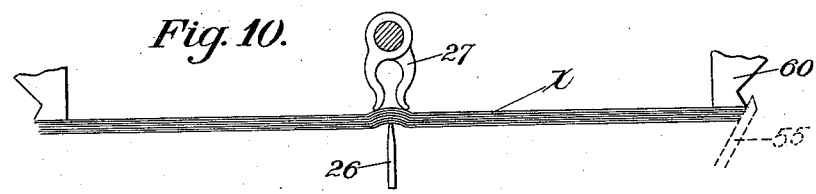
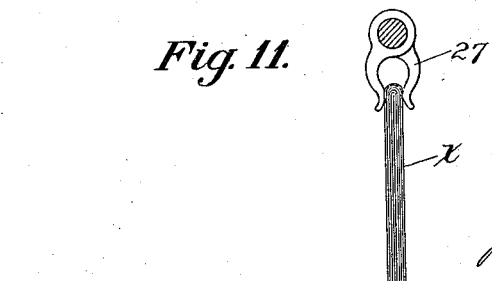

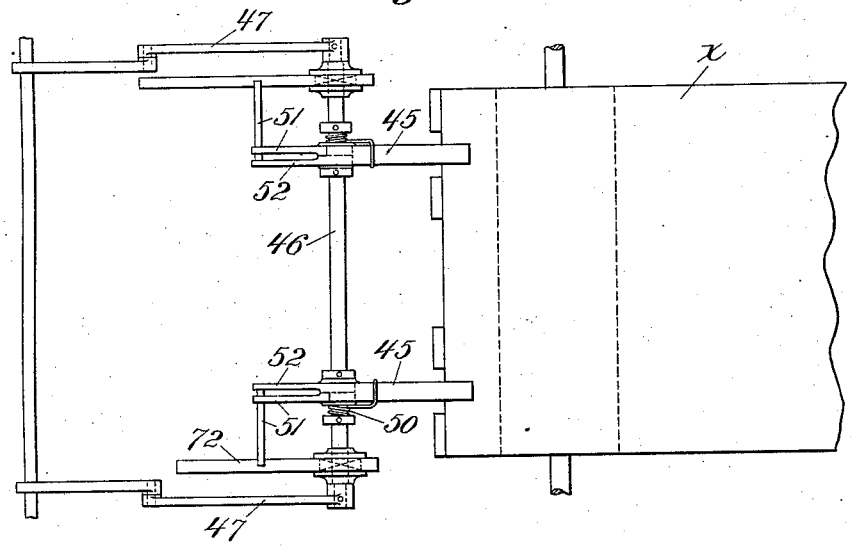
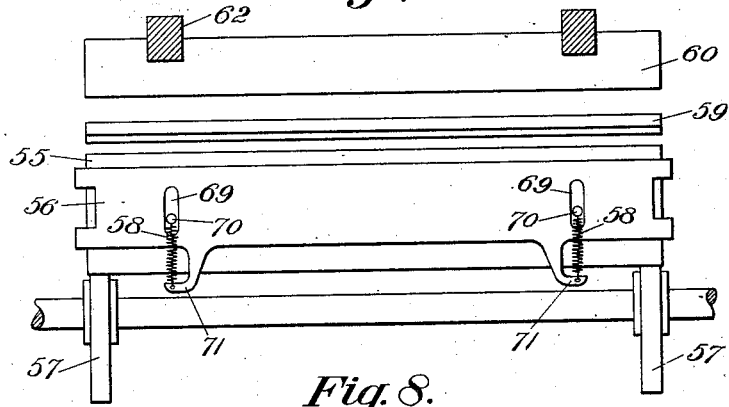
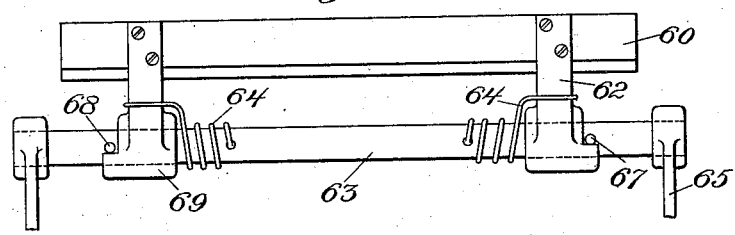

UNITED STATES PATENT OFFICE.

RALPH C. SEYMOUR, OF LARCHMONT, NEW YORK, ASSIGNOR TO GOSS PRINTING PRESS COMPANY, OF CHICAGO, ILLINOIS, A CORPORATION OF ILLINOIS.

METHOD OF MAKING PAMPHLETS OR MAGAZINES.

1,015,745.     Specification of Letters Patent.     Patented Jan. 23, 1912.

Original application filed July 10, 1909, Serial No. 506,956. Divided and this application filed May 23, 1911. Serial No. 629,010.

*To all whom it may concern:*

Be it known that I, RALPH C. SEYMOUR, a citizen of the United States, and a resident of Larchmont, in the county of Westchester and State of New York, have invented new and useful Improvements in Methods of Making Pamphlets or Magazines, of which the following is a specification.

The invention relates to a process of making pamphlets or magazines, and has for its objects producing such pamphlets or magazines of neat appearance and with great rapidity and to provide further a novel method of trimming in connection with binding and folding the sheets one within the other.

The invention has in view especially the making up of a magazine or pamphlet in which a large number of sheets are associated, or in which the sheets are of extra heavy paper, or both, and then the entire bundle of associated sheets is folded to make the complete magazine or pamphlet at one folding, instead of bringing together a plurality of previously folded signatures. Certain periodicals of wide circulation are made in this way, which permits of great speed and economy, and the trimming of the front edges as provided for by my invention, further gives a product of attractive and pleasing appearance.

Other objects of invention will in part be obvious and will in part more fully appear herein.

This application is a division of my application Ser. No. 506,956 filed July 10, 1909.

It will be obvious that the invention may be carried out by hand. For convenience, however, there is shown herewith the same drawings as in said parent application.

The accompanying drawings, referred to herein and forming a part hereof illustrate one manner of carrying out the invention, the same serving in connection with the description herein to explain the principles of the invention.

Figure 6:
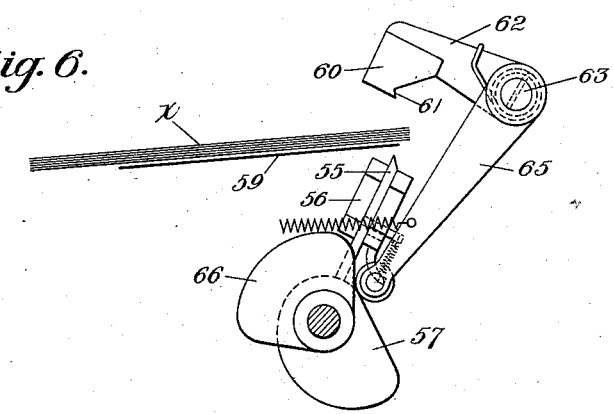
Figure 1:
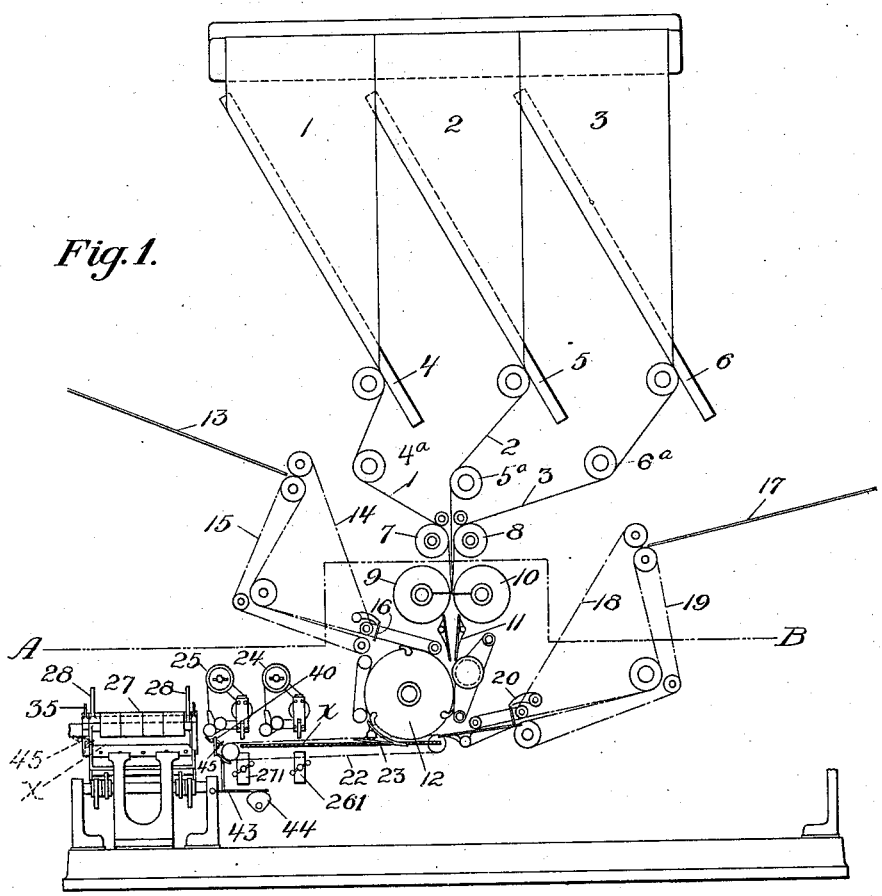

Of the drawings:—Figure 1 is a general elevation of a machine which may be used in carrying out the method of the invention; Fig. 2 is an end view corresponding to Fig. 1; Fig. 3 is a sectional plan on the line A—B of Fig. 1; Figs. 4 and 5 are detail elevation and plan, respectively, of the sheet forwarding devices; Figs. 6, 7 and 8 are details of the edge clamping and trimming devices; Figs. 9 and 10 are details showing the method of edge trimming and the manner of folding; and Fig. 11 shows the complete trimmed and folded pamphlet held by the folding jaws.

Referring to the accompanying drawings, illustrating by way of example one manner of carrying out the process of the invention, the association of a plurality of webs, or slitted parts of a single web, 1, 2 and 3 is shown in Fig. 1. Said slitted webs are run over turner bars 4, 5 and 6, and are then run together by means of suitable rollers $4^a$, $5^a$ and $6^a$, and finally are run between rollers 7 and 8. The associated webs are then cut into sheets by suitable means such as the rotary cutters 9 and 10. These sheets are then conveyed through the throat 11 to the collecting cylinder 12.

If desired a cover or insert sheet may be supplied to the bundle of associated sheets, which cover or insert is usually printed separately from said sheets. Such insert or cover sheet may be fed down from the feed board or guideway 13 by means of the tapes 14 and 15. The gate or stop 16 then admits the sheet to the cylinder 12, where it is associated with the bundle of sheets in a manner which will be well understood. If desired also a second additional sheet may be fed in and associated with the bundle of sheets. In the present instance said sheet may be fed from the board 17 by means of the tapes 18 and 19 to the gate 20. This gate may be timed to release said sheet in proper relation to the bundle of sheets carried by the cylinder 12 and to permit it to feed to the tapes 22 which serve to travel the bundle of sheets along their path to the mechanisms which subsequently operate upon them. If the cylinder 12 is used to collect, the strippers 23 may be used to take off the sheet bundle at the proper time and in a well known manner. In the present instance they are shown fed along by the tapes 22 until brought to rest against the gage or stop 40. The stop 40 serves to bring the sheet bundle and the cover or insert into register with each other and to bring them all into register with the stitchers just prior to their being stitched together. When so registered and positioned, they are bound or stitched together by suitable devices such as the wire stitchers or staplers 24 and 25, with which coöperate, respectively, the clenchers 261 and 271. The sheets are then conveyed along their path to be trimmed, folded and delivered. The gage 40 is swung downwardly out of the path of the sheet by its connections the arm 41, link 42, lever 43 and cam 44. The registered and stitched bundle of sheets $x$ is firmly gripped, as shown in Fig. 4, by the grippers 45 which are acted upon by the springs 50, and are opened by the arms 51 and 52 striking the trips 53 and 54. The grippers 45 pass inwardly through interruptions in the gage 40 and firmly grip the bundle $x$ of sheets, as shown in Fig. 3. The grippers then reciprocate along their ways 72 under the impulsion of the operating mechanism comprising the links 47 and levers 48 and cams 49. The edges of the sheet which will constitute the front edge of the pamphlet or magazine, that is, the edges which are opposite each other and parallel to the line of stitches by which the sheet bundle has been bound together, and which edges are brought together by the folding along the line of the stitches to constitute said front edge of the book, that is, the edge opposite the back, are trimmed at a bevel to compensate for the infolding of the sheets. Said bevel on each of said edges, inclines inwardly from what will be the outside sheet after the fold is made to the inside sheet, as will be clearly seen from Fig. 10. In other words, when the entire bundle of sheets is folded, the inner sheet will be the smallest and the outer sheet will be the largest by reason of such beveled trimming. The bevel will be such that when the two edges are brought together, they will present a straight or uniform edge at the front of the book, that is, the edge opposite the back, as shown in Fig. 11.

In carrying out the invention with the illustrated mechanism, the bundle of sheets $x$ is held or clamped near the edges to be trimmed by the spring clamps 60 which are rocked by their arms 62, which are carried upon the shaft 63 which is in turn actuated by the spring-pressed arms 65 coöperating with a cam 66. The pressure of the clamping members may be a yielding pressure if desired, and this is effected in the present instance by the springs 64 which act upon the arms 62 and are fast to the shaft 63, the arms 62 in said case bearing on shaft 63 by means of shouldered collars 69 working against pins 67 and 68, respectively.

The trimming knives 55 are shown reciprocably mounted in guides 56 and actuated by cams 57 to which they are held by the springs 58, which act between pins 70 on the knives 55 and lugs 71 on the frame. The knives 55 act with the cutting edge 61 on the clamping block 60. The edges of the sheets are then trimmed, as shown in Figs. 2, 9 and 10 of the drawings, at a bevel in the manner already described, thus reducing the size of the sheets gradually from the outermost to the innermost. After the trimming of the edges, the sheets are unclamped, the folding jaws 27 swing downwardly to hold the sheets $x$ over the folding blade 26, and the arms 28 swing upwardly about their bearings 29, being actuated through the arm 30, link 31, lever 32 (pivoted at 32ª) from cam 33. The trip arm 35 engages the cam 36 to open the folding jaws, to permit the completed magazine or pamphlet to drop on the delivery carrier 34. As the sheets are brought together into the form of the book or pamphlet $x$, the front edge will then be straight, as shown in Fig. 11, by reason of the compensating trimming of said edges just described, and the book or pamphlet will present a neat and pleasing appearance.

What I do claim as my invention and desire to secure by Letters Patent, is:

The process of making a pamphlet which comprises associating a plurality of sheets, stitching said associated sheets together, while flat, trimming each of the edges of the associated sheets which are parallel to each other on opposite sides of the stitching at a bevel inclining inwardly from the outer to the inner sheet, folding the stitched and trimmed sheets at said stitching to bring said inner sheet within and said outer sheet without, said bevel being proportioned to present a substantially straight front edge when the two trimmed edges are brought together by the folding.

In testimony whereof, I have signed my name to this specification, in the presence of two subscribing witnesses.

RALPH C. SEYMOUR.

Witnesses:
JOHN D. MORGAN,
ROSE MENK.